United States Patent Office 2,859,245
Patented Nov. 4, 1958

2,859,245

REACTION OF SF₄ WITH ORGANIC COMPOUNDS CONTAINING A CARBONYL RADICAL

William C. Smith, Wilmington, Del., assignor to E. I. du Pont de Nemours and Company, Wilmington, Del., a corporation of Delaware No Drawing. Application November 14, 1956
Serial No. 622,025

11 Claims. (Cl. 260—544)

This invention relates to a new process of preparing fluorine-containing organic compounds. More particularly it relates to a process of preparing compounds containing difluoromethylene and trifluoromethyl groups.

Organic compounds containing fluorine have achieved technical importance in recent years because of unusual chemical and physical properties such as high thermal stability and marked resistance to oxidative decomposition. Simple and economical methods of obtaining fluorinated compounds have, therefore, become important. Present methods of introducing fluorine into compounds employ reactants which are frequently not readily accessible and also yield undesirable by-products because of polymerization and decomposition of reactants.

An object of this invention is consequently provision of a new process for synthesizing organic fluorine compounds.

A further object is provision of a process for synthesizing organic fluorine compounds which employs readily available materials under commercially-feasible conditions.

The above-mentioned and yet further objects are accomplished in accordance with this invention by the reaction of sulfur tetrafluoride, $SF_4$, with an organic compound containing at least one oxygen doubly bonded to one carbon, any remaining atoms on said carbon being singly bonded and at most one of said atoms being monovalent. In the preferred form of the invention $SF_4$ is reacted with a compound containing at least one oxygen doubly bonded to carbon, any remaining atoms on said carbon being at least one singly bonded carbon and at most one hydrogen, halogen or atom of atomic number of 7 to 8, inclusive. The compounds which are reacted with $SF_4$ are referred to hereinafter as carbonyl compounds.

Typical classes of carbonyl compounds serviceable in the reaction, with specific examples in parentheses, are carbon oxides (carbon monoxide, carbon dioxide), the oxo or oxo-carbonylic compounds, ketones (acetone) and aldehydes (benzaldehyde), and organic non-oxo-carbonylic compounds such as organic acids (benzoic acid), organic anhydrides (phthalic anhydride), acyl halides (benzoyl chloride), amides (N,N-dimethyl-benzamide), esters (methyl benzoate, diethyl carbonate) and salts of organic acids (potassium oxalate).

Sulfur tetrafluoride, now used as the fluorinating agent for carbonyl compounds, can be prepared by methods described in the literature (Brown and Robinson, J. Chem. Soc. 1955, 3147–51).

The reaction of the carbonyl compound with sulfur tetrafluoride is conducted under substantially anhydrous conditions in a closed vessel whose inner surface is made of a material resistant to chemical attack by hydrogen fluoride. The air in the reaction chamber is preferably displaced with an inert gas, for example nitrogen, before the reactants are charged into the chamber. The carbonyl compound is preferably charged into the chamber first and the chamber cooled and evacuated. Sulfur tetrafluoride is then added to the cooled chamber.

The mole ratio of reactants and the conditions chosen for maximum yield of product are determined by the chemical reactivity and thermal stability of the reactants and of the fluorine-containing products formed in the reaction.

The mole ratio of sulfur tetrafluoride to each carbonyl group in the compound being fluorinated is preferably not less than 1:1 or more than 6:1. With compounds of low chemical reactivity, a considerable excess of sulfur tetrafluoride is utilized.

To avoid formation of by-products, the temperature of the reaction is kept as low as operability permits and preferably lies between 25° and 350° C. The pressure employed is generally autogenous. This pressure is generally between 5 and 50 atmospheres but pressures outside this range are operable. The reaction time is between about 2 and 48 hours. During the reaction period the contents of the reaction vessel are preferably mixed artificially, e. g., by mechanical stirring or shaking.

The fluorination can be carried out advantageously in the presence of a catalyst consisting of one or more fluoride ion acceptors. Examples of fluoride ion acceptors useful as catalysts in this reaction are hydrogen fluoride, boron trifluoride, arsenic trifluoride, phosphorus pentafluoride, titanium tetrafluoride and silicon tetrafluoride. Use of the fluoride ion acceptor improves the yield of fluorinated products and reduces the formation of by-products. Such a catalyst is particularly desirable with those carbonyl compounds which, without the catalyst, require high temperatures and long periods of reaction to effect fluorination. Hydrogen fluoride is a preferred catalyst and compounds which generate hydrogen fluoride under the conditions of the reaction can be substituted therefor.

In the operation of this process the oxygen of the carbonyl group is replaced by two fluorine atoms. Additional fluorine atoms may, however, be introduced depending on the structure of the carbonyl compound. Normally two fluorine atoms are introduced into carbonyl compounds in which both residual bonds of the carbon of the carbonyl group are attached to carbon. Two fluorine atoms are also introduced into the compound if one of the residual bonds of the carbon in the carbonyl group is attached to carbon and one to hydrogen or a tertiary nitrogen atom. Generally, three fluorine atoms will enter the compound if one bond of the carbon of the carbonyl group is attached to halogen, oxygen or primary or secondary nitrogen. Thus while two fluorine atoms are introduced into a compound such as benzophenone, three are introduced into compounds such as benzoyl chloride, benzoic acid, methyl benzoate and benzamide. Oxygen which is initially doubly bonded to the carbon of the carbonyl compound is removed as a component of the by-products.

Isolation and purification of the fluorinated product after completion of the reaction is accomplished by well-recognized procedures. A preferred method consists in pouring the crude reaction products into an inert solvent containing a hydrogen fluoride acceptor, for example, an alkali or alkaline earth metal fluoride, agitating, filtering, removing the solvent and distilling the fluorinated compound. Alternatively the crude reaction product can be stored for a period of time under reduced pressure in the presence of an acid acceptor, for example, sodium hydroxide, and then distilled. If hydrogen fluoride is not used as a catalyst or is not formed as a by-product, the preliminary purification steps are not necessary; the product is separated from the crude reaction mixture by distillation or crystallization.

Various modifications can be made in the process described. Thus, inert solvents can be used to dissolve solid reactants and to modify the vigor of the reaction where highly reactive chemicals are used. Suitable solvents are benzene, hexane, octane, cyclohexane and perfluorinated compounds such as perfluorocyclohexane.

The reaction tube can be purged with any chemically inert gas to remove substantially all of the oxygen from the tube. The lining of the reaction tube can be any material that is not attacked by fluorine or hydrogen fluoride. The various stainless steel alloys, platinum and platinum alloys are useful for the purpose.

The reactions can be conducted in closed vessels under autogenous pressure or can be performed in a continuous flow system wherein the reactants are cycled through a hot tube with continuous removal of the fluorinated product.

The operation of the invention is illustrated in the following examples in which quantities of reactants (parts) and percentages are given in terms of weight. Pressures are in mm. of mercury unless otherwise noted.

Example I

A "Hastelloy"-lined bomb (capacity, 145 parts of water) was charged with 34.8 parts of acetone and 75 parts of sulfur tetrafluoride. The mixture was heated with shaking at 110° C. for 16 hours. The reaction products, all of which were gaseous at room temperature, were distilled in a low-temperature still. There was obtained 30.5 parts of 2,2-difluoropropane which boiled at −10° to −5° C. The identity of the product was confirmed by mass spectrometric analysis. Thionyl fluoride was obtained as a by-product.

The "Hastelloy" of this specification is "Hastelloy" C, a well-known, chemically-resistant alloy of nickel, iron and molybdenum.

Example II

A bomb similar to that used in Example I was charged with 39.2 parts of cyclohexanone and 44 parts of sulfur tetrafluoride. The reactants were heated with shaking at 39° C. for 13 hours. Fractional distillation of the crude reaction product yielded 14.9 parts of 1,1-difluorocyclohexane, boiling at 80° C. The structure of the compound was confirmed by the nuclear magnetic resonance spectrum and by analysis for fluorine.

F (calculated), 31.7%; F (found), 30.95%.

Example III

A bomb similar to that used in Example I was charged with 36.4 parts of benzophenone and 44 parts of sulfur tetrafluoride and then heated 18 hours at 180° C. There was obtained 36.1 parts of a dark liquid and a small quantity of a soft solid. Distillation of the liquid at 3 mm. pressure yielded 2.9 parts of pure difluorodiphenylmethane and 1.1 parts of impure (about 75% purity) difluorodiphenylmethane. The structure of the products and their purity was determined by nuclear magnetic resonance and infrared spectra.

Example IV

A bomb similar to that used in Example I was charged with 45.6 parts of benzophenone, 1 part of hydrogen fluoride and 54 parts of sulfur tetrafluoride. It was heated for 2 hours at 100° C., 2 hours at 150° C. and 6 hours at 180° C. There was obtained 50 parts of a liquid product which was poured into 80 parts of petroleum ether containing 12 parts of sodium fluoride. The petroleum ether solution was filtered and the solvent removed by distillation. Distillation of the residual oil gave 49.3 parts of difluorodiphenylmethane, boiling 114 to 115° C. at 7.5 mm. The high yield of product (97% of theory) in this reaction shows the value of using a fluoride ion acceptor.

Example V

A bomb similar to that used in Example I was charged with 26.3 parts of benzil and 47 parts of sulfur tetrafluoride. The reactants were heated at 100° C. for 2 hours, at 120° C. for 2 hours and at 140° C. for 6 hours. There was obtained 22 parts of solid product which was purified by crystallization from hexane to yield 1,2-diphenyltetrafluoroethane, M. P. 122–123° C. The identity of the compound was confirmed by nuclear magnetic resonance data and by analysis for fluorine.

F (calc.), 29.89%; F (found), 29.33%.

Example VI

A bomb similar to that in Example I was charged with 26.4 parts of acetaldehyde and 81 parts of sulfur tetrafluoride, and then heated at 50° C. for 14 hours. The volatile product was collected in a cylinder cooled in liquid nitrogen and then transferred to an all-glass low temperature still. Low temperature distillation resulted in the separation of volatile products boiling at −50 to −34° C. containing thionyl fluoride and unreacted sulfur tetrafluoride; the remaining 15.5 parts of volatile product, collected on allowing the still to warm up to room temperature, contained 97.2 mole percent of 1,1-difluoroethane as shown by mass spectrometric analysis of the liquid phase.

Example VII

A bomb similar to that used in Example I was charged with 31.8 parts of benzaldehyde and 66 parts of sulfur tetrafluoride. The reactants were heated with shaking at 100° C. for 2 hours and at 150° C. for 6 hours. The crude liquid reaction product was fractionally distilled at atmospheric pressure to yield 25.3 parts of α,α-difluorotoluene, boiling at 130°–135° C. The identity of the product was confirmed by the nuclear magnetic resonance spectrum and by elementary analysis.

Calc. for $C_7H_5F_2$: F, 29.7%. Found: F, 29.5%.

Example VIII

A bomb similar to that used in Example I was charged with 20.1 parts of dry recrystallized terephthaldehyde and 108 parts of sulfur tetrafluoride. The reactants were heated with shaking for 2 hours at 100° C. and for 8 hours at 150° C. The crude liquid reaction product was fractionally distilled and 22 parts of α,α,α',α'-tetrafluoro-p-xylene obtained as a colorless liquid which boiled at 54° C. under 20 mm. pressure. Elemental analysis of the product gave the following results:

Calc. for $C_8H_6F_4$: C, 53.8%; H, 3.40%; F, 42.7%. Found: C, 52.49%; H, 3.51%; F, 42.87%.

Examples I–VIII above illustrate the invention in its application to oxo-compounds having at most one monovalent element on the carbonyl. The invention is generic to the reaction of sulfur tetrafluoride with such oxo-compounds including not only those of the examples but also ketones in general and aldehydes of at least two carbons in general. Thus, the oxo-compounds of the examples above can be replaced by furfural, methyl ethyl ketone, β-chloroethyl methyl ketone, cyclopentanone, p-fluoroacetophenone, p-methylcyclohexanone, methyl cyclohexyl ketone, propionaldehyde, isobutyraldehyde, valeraldehyde, dodecyl aldehyde, and the like.

Example IX

A bomb similar to that used in Example I was charged with 4.6 parts of formic acid and 44 parts sulfur tetrafluoride. It was heated at 60° C. for 2 hours, 90° C. for 2 hours and 120° C. for 6 hours. There was obtained 48 parts of gaseous products of which approximately 0.4 part was fluoroform.

Example X

A bomb similar to that used in Example I was charged with 22.1 parts of heptanoic acid and 80 parts of sulfur tetrafluoride. It was heated at 100° C. for 4 hours and 120° C. for 6 hours. There was obtained 13.5 parts of liquid product which was poured into 65 parts of dry ether containing 10 parts of sodium fluoride pellets. The solution was filtered and the ether removed by distillation. The residual liquid was distilled at 754 mm. to give 9.7 parts of 1,1,1-trifluoroheptane, boiling at 100° to 100.5°

C ($n_D^{24.9}$:1.3450). The structure of the compound was confirmed by nuclear magnetic resonance spectrum and by elementary analysis.

Calc. for $C_2H_{13}F_3$: F, 36.97%. Found: F, 37.72%.

Example XI

A bomb similar to that used in Example I was charged with 30.5 parts of benzoic acid and 54 parts of sulfur tetrafluoride. It was heated 4 hours at 100° C. and 6 hours at 120° C. There was obtained 37 parts of a fuming brown liquid which was placed in a vacuum desiccator under reduced pressure over pellets of potassium hydroxide to remove hydrogen fluoride. The liquid was then distilled over 3 parts of sodium fluoride to yield 8.1 parts of benzotrifluoride, boiling at 97–108° C. Redistillation of the benzotrifluoride yielded a product boiling at 100–101° C. ($n_D^{24.9}$:1.4133).

Calc. for $C_7H_5F_3$: F, 39.01%. Found: F, 39.05%.

Benzoyl fluoride was obtained as a by-product in this reaction.

Example XII

A bomb similar to that used in Example I was charged with 16.6 parts of phthalic acid and 60 parts of sulfur tetrafluoride. It was heated at 100° C. for 4 hours and 120° C. for 6 hours. There was obtained 19.6 parts of a brown liquid which was placed in a vacuum desiccator over sodium fluoride. The liquid was then distilled over 1 part of sodium fluoride to give 9.2 parts of o-bis(trifluoromethyl)benzene, B. P. 140–144° C. at 760 mm. and 4.4 parts of o-(trifluoromethyl)benzoyl fluoride, boiling at 175–178° C. The structures of these products were confirmed by nuclear magnetic resonance spectra and elementary analyses.

Calc. for $C_8H_4F_6$: F, 53.24%. Found: F, 53.09%.
Calc. for $C_8H_4F_4O$: F, 39.56%. Found: F, 39.11%.

Example XIII

A bomb similar to that used in Example I was charged with 16.6 parts of terephthalic acid and 65 parts of sulfur tetrafluoride. It was heated at 100° C. for 4 hours and 120° C. for 6 hours. There was obtained 23 parts of liquid product which was poured into 40 parts of dry ether containing 12 parts of sodium fluoride. After filtration and removal of the ether, the residual liquid was distilled to yield 11.4 parts of p-bis-trifluoromethyl)benzene, boiling at 113–115° C., and 0.5 part of p-(trifluoromethyl)benzoyl fluoride, boiling at 156° C.

Example XIV

A bomb similar to that used in Example I was charged with 7.2 parts of acrylic acid (stabilized with methylene blue) and 33 parts of sulfur tetrafluoride. The bomb was heated at 100° C. for 4 hours and at 120° C. for 6 hours. The volatile product was condensed into an evacuated stainless steel cylinder. There was obtained 31.5 parts of product which was shown by mass spectrometric analysis to contain principally 3,3,3-trifluoropropylene with thionyl fluoride and unreacted sulfur tetrafluoride.

Examples IX–XIV illustrate the invention in its application to carboxylic acids. The invention is, in fact, generic to the reaction of sulfur tetrafluoride with carboxylic acids. Any carboxylic acid may be substituted for those of Examples IX–XIV including trifluoroacetic acid, trichloroacetic acid, butyric acid, caproic acid, stearic acid, oxalic acid, citric acid, adipic acid, suberic acid, hexahydrobenzoic acid, naphthalenedicarboxylic acids, and the like.

Example XV

A stainless steel bomb (capacity, 400 parts of water) was charged with 59.2 parts of phthalic anhydride and 172 parts of sulfur tetrafluoride. It was heated at 180° C. for 2 hours, 250° C. for 1 hour and at 350° C. for 11 hours. Fractional distillation of the crude liquid product at atmospheric pressure yielded 38.3 parts of o-bis(trifluoromethyl)benzene boiling at 143° C. The identity of the product was confirmed by comparison of its boiling point with that given in the literature and by the nuclear magnetic resonance spectrum.

Example XV illustrates the reaction of sulfur tetrafluoride with another class of non-oxo-carbonylic compounds, the acid anhydrides. The invention is generic to the reaction of sulfur tetrafluoride with acid anhydrides, i. e., those having the —CO—O—CO— grouping including acetic, propionic, maleic, succinic and benzoic anhydrides, and the like.

Example XVI

A bomb similar to that used in Example I was charged with 20 parts of N,N-dimethylacetamide and 29.5 parts of sulfur tetrafluoride. It was heated at 100° C. for 4 hours and 140° C. for 6 hours. The product, 11.8 parts of dark liquid, yielded, upon distillation, 1.5 parts of 1,1-difluoroethyldimethylamine as shown by the nuclear magnetic resonance spectrum. This compound had poor chemical stability and tended to decompose on heating.

Example XVII

A bomb similar to that used in Example I was charged with 24.2 parts of benzamide and 44 parts of sulfur tetrafluoride. It was heated at 100° C. for 2 hours and 150° C. for 8 hours. There was obtained 53.1 parts of a fuming brown liquid which was placed in a vacuum desiccator over sodium hydroxide pellets and also treated with sodium fluoride pellets to remove free hydrogen fluoride. After filtration the liquid was distilled to yield 3.7 parts of benzotrifluoride boiling at 36–38° C. at 64 mm. ($n_D^{25}$:1.4150).

Example XVIII

A bomb similar to that used in Example I was charged with 37.3 parts of N,N-dimethylbenzamide and 56 parts of sulfur tetrafluoride. It was heated at 100° C. for 4 hours and 120° C. for 6 hours. There was obtained 42.6 parts of liquid product which on distillation yielded 3 parts of α,α-difluorobenzyldimethylamine boiling at 70–71° C. at 15 mm. The liquid product was insoluble in water, soluble in 5% aqueous hydrochloric acid and analyzed as follows:

Calc. for $C_9H_{11}NF_2$: C, 63.14%; H, 6.48%; N, 8.18%; F, 22.20%. Found: C, 64.05%; H, 6.47%; N, 8.02%; F, 21.63%.

Examples XVI through XVIII illustrate the invention in its application to another class of non-oxo-carbonylic compounds, namely, the carboxylic acid amides. The reaction is generic to the reaction of sulfur tetrafluoride with carboxylic acid amides including acetamide, N-methylbutyramide, N,N-diethylstearamide, N,N-dimethylhexahydrobenzamide, and the like.

Example XIX

A bomb similar to that used in Example I was charged with 28 parts of benzoyl chloride, 5 parts of hydrogen fluoride and 54 parts of sulfur tetrafluoride. It was heated at 60° C. for 2 hours, at 90° C. for 2 hours and at 120° C. for 6 hours. There was obtained 44 parts of dark fuming liquid which was poured into 105 parts of petroleum ether containing 42 parts of sodium fluoride. After filtering the bright yellow solution and removing the petroleum ether the liquid residue, to which 1 part of sodium fluoride had been added, was distilled. There was obtained 10.7 parts of a liquid boiling at 138–139° C. at 770 mm., which had a refractive index, $n_D^{25}$, of 1.4459. The liquid was shown by infrared and nuclear magnetic resonance spectra to be m-chlorobenzotrifluoride. Its structure was proved conclusively by hydrolyzing to pure m-chlorobenzoic acid (M. P. 152–153° C.) and by elementary analysis.

Calc. for $C_2H_4ClF_3$: C, 46.56%; H, 2.23%; Cl, 19.64%; F, 31.57%. Found: C, 47.32%; H, 2.30%; Cl, 19.48%; F, 31.50%.

Example XX

A bomb similar to that used in Example I was charged with 18 parts of benzoyl fluoride, 1 part of hydrogen fluoride and 33 parts of sulfur tetrafluoride. It was heated at 100° C. for 4 hours and at 120° C. for 6 hours. There was obtained 16 parts of a liquid which was poured into 40 parts of petroleum ether containing 6 parts of sodium fluoride. After filtering and removing the petroleum ether, the residual liquid was distilled from 0.5 part of sodium fluoride to give 8.6 parts of benzotrifluoride, boiling at 100° C. at 758 mm. ($n_D^{24.9}$: 1.4124).

Example XXI

A bomb similar to that used in Example I was charged with 25.5 parts of phthaloyl fluoride and 66 parts of sulfur tetrafluoride. The reactants were heated at 200° C. for 2 hours, 250° C. for 6 hours and 300° C. for 8 hours. The crude liquid product was fractionally distilled at atmospheric pressure to yield 1.8 parts of colorless liquid boiling at 176–180° C. and 4.9 parts boiling at 181° C. The nuclear magnetic resonance spectra of both fractions were the same and conformed to the spectrum expected for o-trifluoromethylbenzoyl fluoride. The identity of the product was further confirmed by elementary analysis of the fraction boiling at 181° C.

Calc. for $C_8H_4F_4O$: C, 50.0%; H, 2.10%; F, 39.6%. Found: C, 50.55%; H, 2.34%; F, 38.28%.

Examples XIX–XXI illustrate the invention in its application to a further class of non-oxo-carbonylic compounds, the acid halides. The invention is generic to the reaction of sulfur tetrafluoride with acid halides having at most one monovalent atom attached to carbonyl including acetyl chloride, butyryl chloride, stearoyl chloride, adipyl bromide, chloroacetyl chloride, and the like.

Example XXII

A bomb similar to that described in Example I was charged with 40.8 parts of methyl benzoate and 66 parts of sulfur tetrafluoride. The reactants were heated at 200° C. for 4 hours, 250° C. for 6 hours and 300° C. for 6 hours. Fractional distillation of the crude reaction product at atmospheric pressure yielded 23.9 parts of benzotrifluoride, boiling at 98° C. Analytical data are:

Calc. for $C_7H_5F_3$: F, 31.7%. Found: F, 30.37%.

Example XXII illustrates the invention as applied to carboxylic acid esters. The invention is generic to the reaction of sulfur tetrafluoride with carboxylic acid etsers including ethyl acetate, methyl butyrate, dimethyl adipate, diethyl succinate, dimethyl phthalate, phthalide, dimethyl carbonate, diisopropyl carbonate and the like.

Example XXIII

A "Hastelloy"-lined bomb (capacity 145 parts of water) was cooled, evacuated and charged with 5 parts of carbon dioxide and 22 parts of sulfur tetrafluoride. The bomb was heated at 500° C. for 2 hours at autogenous pressure. The volatile material was condensed into an evacuated stainless steel cylinder cooled in liquid nitrogen. There was obtained 22.5 parts of gaseous and liquid products. Mass spectrographic analysis of the gaseous products showed that they contained 38.8% by weight of carbon tetrafluoride.

Example XXIV

A bomb similar to that used in Example I was cooled, evacuated and charged with 13 parts of carbon monoxide and 22 parts of sulfur tetrafluoride. The bomb was heated at 500° C. for 2 hours under autogenous pressure. The volatile material was condensed into an evacuated stainless steel cylinder cooled in liquid nitrogen. There was obtained 35 parts of gaseous and liquid products. Mass spectrographic analysis of the gaseous products showed that they contained 2% of carbon tetrafluoride.

Example XXIII, directed to carbon dioxide, and Example XXIV, directed to carbon monoxide, illustrate the invention in its application to the carbon oxides.

In addition to its utility with the numerous compounds illustrated or mentioned above, the process of the invention is applicable to the metal salts of organic acids, particularly the alkali and alkaline earth salts. For example, sodium propionate can be used to prepare 1,1,1-trifluoropropane and sodium benzoate to prepare benzotrifluoride. Reactions of sulfur tetrafluoride with salts of organic acids are conducted at a temperature of approximately 300° C.

Although carbonyl compounds free of reactive groups other than carbonyl are preferably used, compounds containing additional reactive groups are operable in the process but require additional quantities of sulfur tetrafluoride. For example, carbonyl compounds containing amine, hydroxyl and mercapto groups react with sulfur tetrafluoride through these groups as well as the carbonyl groups to yield a mixture of fluorinated products. Compounds containing unsaturation are also operable, for example, methacrylic acid and propiolic acid.

The treatment of carboxylic acids with sulfur tetrafluoride may yield products in which both the oxygen of the carbonyl group and the hydroxyl group are replaced or in which only the hydroxyl group is replaced. This fact is illustrated in Example XI with benzoic acid, in Example XII with phathalic acid and in Example XIII with terephthalic acid. The relative quantities of trifluoromethyl substituted product and acyl fluoride substituted product obtained are dependent on the reaction conditions, particularly on the temperature.

From the foregoing discussion, it will be clear that the invention is generic to the reaction of sulfur tetrafluoride with organic compounds having at least one oxygen doubly bonded to one carbon, any remaining atoms on said carbon being only singly bonded to the carbon and at most one of said remaining atoms being monovalent. It is thus generically aplicable to carbon monoxide, to carbon dioxide, to oxo compounds of at least two carbons and to non-oxo carbonylic compounds, as described in the examples. The reaction is also applicable to polymers containing carbonyl groups, for example, ethylene/carbon monoxide polymers of the type described in U. S. 2,495,286.

The fluorinated compounds obtained by the process of this invention are, in general, known compounds. Physically, they may be gases, liquids or solids which can be employed in a large number of fields. They can be used as gaseous or liquid carriers in aerosol sprays in the field of insecticides. They can be used as solvents and thinners in lacquers and paints. They are useful as liquid media for the preparation of dispersions of carbon black and graphite. They can also serve as intermediates in the preparation of other fluorine-containing compounds which are difficult to obtain.

The foregoing detailed description has been given to impart clearness of understanding only and no unnecessary limitations are to be inferred therefrom. Since obvious modifications will occur to those skilled in the art, the invention is not limited to the exact details shown and described. Consequently, I propose to be bound solely by the appended claims.

The embodiments of the invention in which an exclusive property or privilege is claimed are defined as follows:

1. The process for the preparation of organic fluorine compounds which comprises reacting sulfur tetrafluoride under anhydrous conditions with an organic compound containing at least one oxygen doubly bonded to one carbon, any remaining atoms on said carbon being singly bonded to said carbon and at most one of said remaining atoms being monovalent.

2. The process for the preparation of organic fluorine compounds which comprises reacting sulfur tetrafluoride under anhydrous conditions with an organic compound containing at least one oxygen doubly bonded to one carbon, any remaining atoms on said carbon being singly bonded to said carbon and at most one of said remaining atoms being monovalent, said compound being selected from the class consisting of carbon oxides, organic oxo-carbonylic compounds and organic non-oxo-carbonylic compounds.

3. The process for the preparation of organic fluorine compounds which comprises reacting sulfur tetrafluoride with a ketone.

4. The process for the preparation of organic fluorine compounds which comprises reacting sulfur tetrafluoride with an aldehyde of at least two carbon atoms.

5. The process for the preparation of organic fluorine compounds which comprises reacting sulfur tetrafluoride with a carboxylic acid.

6. The process for the preparation of organic fluorine compounds which comprises reacting sulfur tetrafluoride with a carboxylic acid halide.

7. The process for the preparation of organic fluorine compounds which comprises reacting sulfur tetrafluoride with a carboxylic acid ester.

8. The process for the preparation of organic fluorine compounds which comprises reacting sulfur tetrafluoride with a carboxylic acid amide.

9. The process for the preparation of organic fluorine compounds which comprises reacting sulfur tetrafluoride with a carbon oxide.

10. The process for the preparation of organic fluorine compounds which comprises reacting sulfur tetrafluoride under anhydrous condiitons with an organic compound containing at least one oxygen doubly bonded to one carbon, any remaining atoms on said carbon being singly bonded to said carbon and at most one of said remaining atoms being monovalent, said compound being selected from the class consisting of carbon monoxide, carbon dioxide, ketones, aldehydes of at least two carbons, carboxylic acids, carboxylic acid esters, carboxylic acid halides, carboxylic acid anhydrides, and carboxylic acid amides.

11. The process for the preparation of organic fluorine compounds which comprises reacting sulfur tetrafluoride under substantially anhydrous conditions with an organic compound containing one oxygen doubly bonded to carbon, one of the remaining valences of said carbon being satisfied by a singly bonded carbon and the other by a member of the group consisting of hydrogen, halogen, nitrogen, oxygen and carbon.

No references cited.